United States Patent [19]
Paek

[11] Patent Number: 5,946,128
[45] Date of Patent: Aug. 31, 1999

[54] GRATING ASSISTED ACOUSTO-OPTIC TUNABLE FILTER AND METHOD

[75] Inventor: Eung Gi Paek, Germantown, Md.

[73] Assignee: The United States of America as represented by the Secretary of Commerce, Washington, D.C.

[21] Appl. No.: 09/122,819

[22] Filed: Jul. 27, 1998

Related U.S. Application Data

[60] Provisional application No. 60/055,795, Aug. 15, 1997.

[51] Int. Cl.$^6$ .............................. G02F 1/33; H04J 14/02
[52] U.S. Cl. ......................... 359/305; 359/308; 359/309; 359/130
[58] Field of Search .................................. 359/305, 308, 359/309, 130, 286, 287, 193, 325, 285; 385/7, 37; 356/305

[56] References Cited

U.S. PATENT DOCUMENTS

| | | | |
|---|---|---|---|
| 3,727,062 | 4/1973 | Foster | 250/199 |
| 3,822,929 | 7/1974 | Heidrich et al. | 350/161 |
| 3,944,335 | 3/1976 | Saito et al. | 350/161 |
| 3,988,671 | 10/1976 | Pedinoff | 359/309 |
| 4,602,342 | 7/1986 | Gottlieb et al. | 364/498 |
| 4,639,092 | 1/1987 | Gottlieb et al. | 350/372 |
| 4,653,869 | 3/1987 | Gottlieb et al. | 350/372 |
| 4,786,133 | 11/1988 | Gidon et al. | 350/96.19 |
| 4,798,449 | 1/1989 | Vichon et al. | 359/309 |
| 4,900,113 | 2/1990 | Hatori | 359/305 |
| 4,906,063 | 3/1990 | Sato et al. | 385/7 |
| 4,953,107 | 8/1990 | Yano et al. | 350/149 |
| 5,107,359 | 4/1992 | Ohuchida | 359/124 |
| 5,111,038 | 5/1992 | Taylor et al. | 250/225 |
| 5,173,794 | 12/1992 | Cheung et al. | 359/127 |
| 5,281,907 | 1/1994 | Hartup et al. | 359/305 |
| 5,355,237 | 10/1994 | Lang et al. | 359/130 |
| 5,377,003 | 12/1994 | Lewis et al. | 356/300 |
| 5,434,666 | 7/1995 | Carnahan et al. | 356/328 |
| 5,452,314 | 9/1995 | Aronson | 372/20 |
| 5,477,321 | 12/1995 | Johnson | 356/319 |
| 5,528,368 | 6/1996 | Lewis et al. | 356/346 |
| 5,606,439 | 2/1997 | Wu | 349/117 |
| 5,608,825 | 3/1997 | Ip | 305/24 |
| 5,652,809 | 7/1997 | Aronson | 372/20 |

FOREIGN PATENT DOCUMENTS

| | | |
|---|---|---|
| 10-32463 | 2/1998 | Japan . |
| 10-145173 | 5/1998 | Japan . |

OTHER PUBLICATIONS

Cheung et al., Dense wavelength division multiplexing techniques for high capacity and multiple access communication systems; IEEE Journal on Selected Areas in Communications; vol. 8 No. 6, pp. 945–947; Aug. 1990.

Brackett, Dense wavelenght Division Multiplexing Networks: Principles and Applications; IEEE Journal on Selected Areas in Communications; vol. 8 No. 6, pp. 948–964; Aug. 1990.

Nieh et al., CaMo04 Electronically Tunable Optical Filter; Applied Physics Letters, vol. 17, No. 5, pp. 223–225; Sep. 1970.

Harris et al., Acousto–Optic Tunable Filter; Journal of the Optical Society of America; vol. 59, No. 6; Jun. 1969 pp. 744–747.

(List continued on next page.)

*Primary Examiner*—Georgia Epps
*Assistant Examiner*—Margaret Burke
*Attorney, Agent, or Firm*—Harris and Burdick

[57] ABSTRACT

An acousto-optic tunable filter and filtering method are disclosed providing for a significantly increased number of available wavelength channels for output. The filter combines a diffraction grating, the grating vector of which is transverse to light propagation direction, with an acousto-optic beam deflector, which, by accommodating a narrow spectral bandwidth (about 5% that of conventional acousto-optic tunable filters), provides significantly increased output bandwidth and available wavelength channels (by a factor of approximately 20).

20 Claims, 3 Drawing Sheets

OTHER PUBLICATIONS

Cheung et al., Electronic wavelength Tuning Using Acoustooptic Tunable Filter with Broad Continuous Tuning Range and Narrow Channel Spacing; IEEE Photonics Technology Letters, vol. 1, No. 2; Feb. 1989; pp. 38–40.

Heffner et al., Integrated–Optic Acoustically Tunable Infra–Red Optical Filter; Electronics Letters, vol. 24, No. 25, pp. 1562–1563; Dec. 1998.

Smith et al., Integrated–Optic Acoustically Tunable filters For WDM Networks; IEEE Journal on Selected Areas of Communications; vol. 8 No. 6, pp. 1151–1159; Aug. 1990.

Smith et al., Cascaded Acoustooptic/Fabry–Perot Filter with Finesse Over 2000; IEEE Photonics Technology Letters, vol. 5, No. 2, pp. 189–191, Feb. 1993.

Smith et al., Evolution of the Acousto–Optic Wavelength Routing Switch; Journal of LIghtwave Technology, vol. 14, No. 6, pp. 1005–1019; Jun. 1996.

Soole et al., Spectrometer on chip: a monolithic WDM component; OFC'92, p. 123.

GRATING ASSISTED ACOUSTO-OPTIC TUNABLE FILTER AND METHOD

RELATED U.S. PROVISIONAL PATENT APPLICATION this application is related to U.S. Provisional Patent Application No. 60/055,795 entitled "NARROW BANDWIDTH GRATING-ASSISTED ACOUSTO-OPTIC TUNABLE FILTER" by Eung Gi Paek filed Aug. 15, 1997, makes claim to the invention disclosed therein, and is a continuation-in-part of said U.S. Provisional Patent Application.

FIELD OF THE INVENTION

This invention relates to tunable optic filters, and, more particularly, relates to acousto-optic tunable filters and filtering methods utilized in communications.

BACKGROUND OF THE INVENTION

Dense wavelength division multiplexing (D-WDM) is promising in future information networks to increase the communication bandwidth. One of the most crucial components for effective D-WDM is a fast tunable optical filter. Such tunable optical filters should be able to filter out desired wavelengths quickly, finely (narrow spectral bandwidth) and over a broad tuning range to cover the erbium-doped fiber amplifier (EDFP) passband (from about 1530 nm–1570 nm).

The acousto-optic tunable filter is currently the most commonly utilized for D-WDM. However, the spectral bandwidth of heretofore known acousto-optic tunable filters is broad (several nm for an interaction length of 1 cm) thus causing serious crosstalk problems due to sidelobes. This limits the number of wavelength channels available in D-WDM at a development stage where increasingly faster tunable spectral filters permitting a larger number of wavelength channels within the EDFA passband are demanded. Thus, while acousto-optic devices are promising for this application because they provide fast wavelength tuning (on the order of a few micro seconds), wide tuning range (greater than 100 nm) and simultaneous and independent selection of many wavelengths, further improvement could still be utilized.

SUMMARY OF THE INVENTION

This invention provides an improved tunable acousto-optic filter and method for receiving light from a source and providing plural available light wavelength channels for selective output. The filter and method resolve many of the heretofore known limitations associated with such filters, and especially resolves problems associated with crosstalk due to sidelobes and wavelength channel limitations available for use with D-WDM. The filter maintains rapid tunability, and, with a narrower bandwidth permits a larger number of wavelength channels within the EDFA passband.

The tunable acousto-optic filter of this invention includes in acousto-optic beam deflector having a variable control signal input for selectively deflecting received light. A grating provides a wavelength dependent dispersion of light deflected at the acousto-optic beam deflector in an output plane, thereby defining plural available light wavelength channels for selective output (i.e., a spectrum). Output selection is controlled by shifting of the spectrum at the output plane by changing the control signal applied at the input of the acousto-optic beam deflector.

The acousto-optic beam deflector is associated with an optical deflector assembly and includes a variable rf control signal input. The deflector assembly collimates received light and selectively deflects collimated light responsive to frequency of signal applied at the rf control signal input. The grating is characterized by grating vector orientation transverse to light propagation direction.

The filtering method of this invention for increasing wavelength channels available for output from a tunable optical filter includes the steps of acousto-optically deflecting light input and diffracting the deflected light providing a wavelength dependent dispersion of light.

It is therefore an object of this invention to provide an improved tunable acousto-optic filter and method for receiving light from a source and providing plural available light wavelength channels for selective output.

It is another object of this invention to provide a tunable acousto-optic filter and method that resolves problems associated with crosstalk due to sidelobes and wavelength channel limitations available for use with D-WDM.

It is still another object of this invention to provide a tunable acousto-optic filter and method that maintains rapid tunability, and, with a narrower bandwidth, permits a larger number of wavelength channels within the EDFA passband.

It is yet another object of this invention to provide a tunable acousto-optic filter receiving light from a source and providing plural available Light wavelength channels for selective output, the filter comprising an acousto-optic beam deflector having a variable control signal input for selectively deflecting received light, and a grating for wavelength dependent dispersion of light deflected at the acousto-optic beam deflector in an output plane.

It is still another object of this invention to provide a tunable acousto-optic filter including an optical deflector assembly having a variable rf control signal input, the assembly for collimating received light and for selectively deflecting collimated light responsive to frequency of signal applied at the rf control signal input, and a diffraction grating characterized by grating vector orientation transverse to light propagation direction for wavelength dependent dispersion of light deflected at the optical deflector assembly.

It is still another object of this invention to provide a method for increasing wavelength channels available for output from a tunable optical filter including the steps of acousto-optically deflecting light input, and diffracting the deflected light providing a wavelength dependent dispersion of light.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
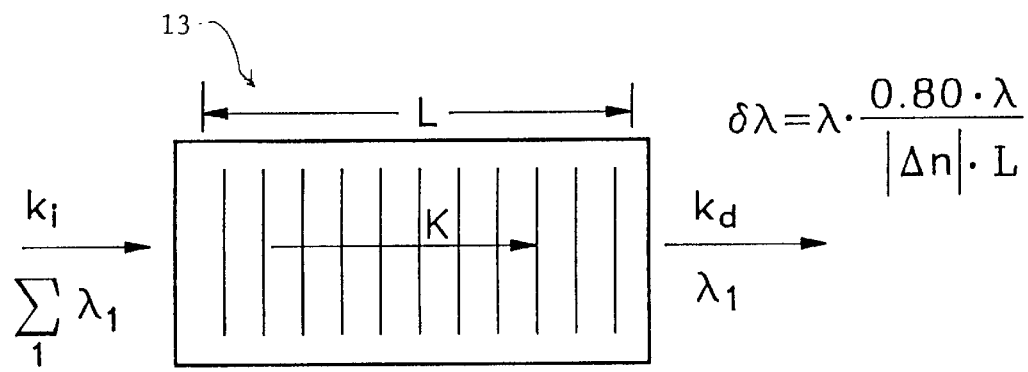
FIG. 1 is a diagrammatic representation of a first prior art device utilized for acousto-optic filtering.
Figure 2:
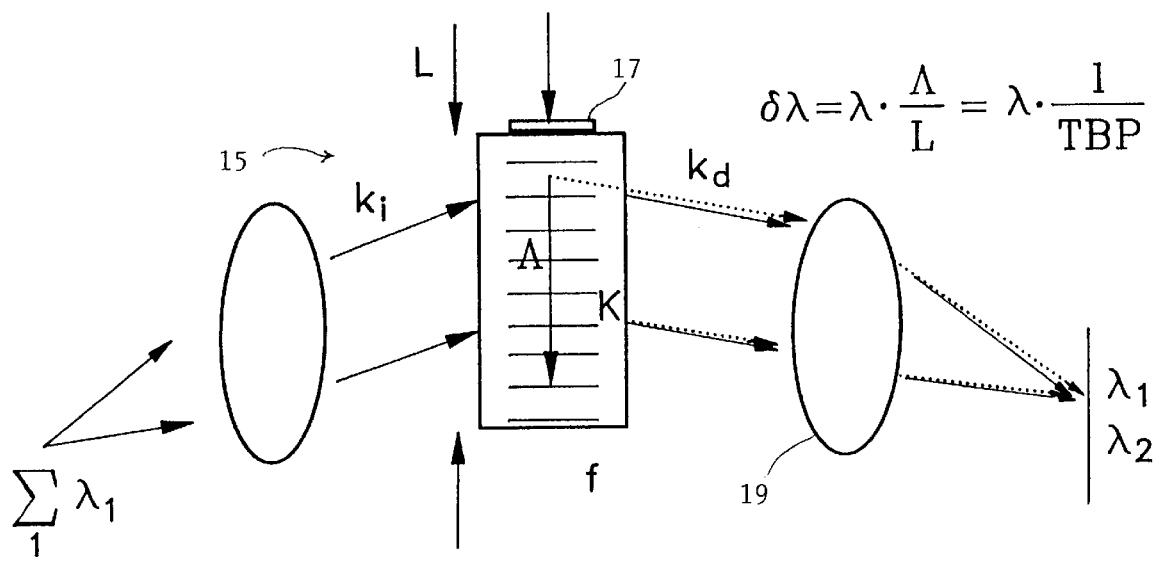
FIG. 2 is a diagrammatic representation of a second prior art device.
Figure 3:
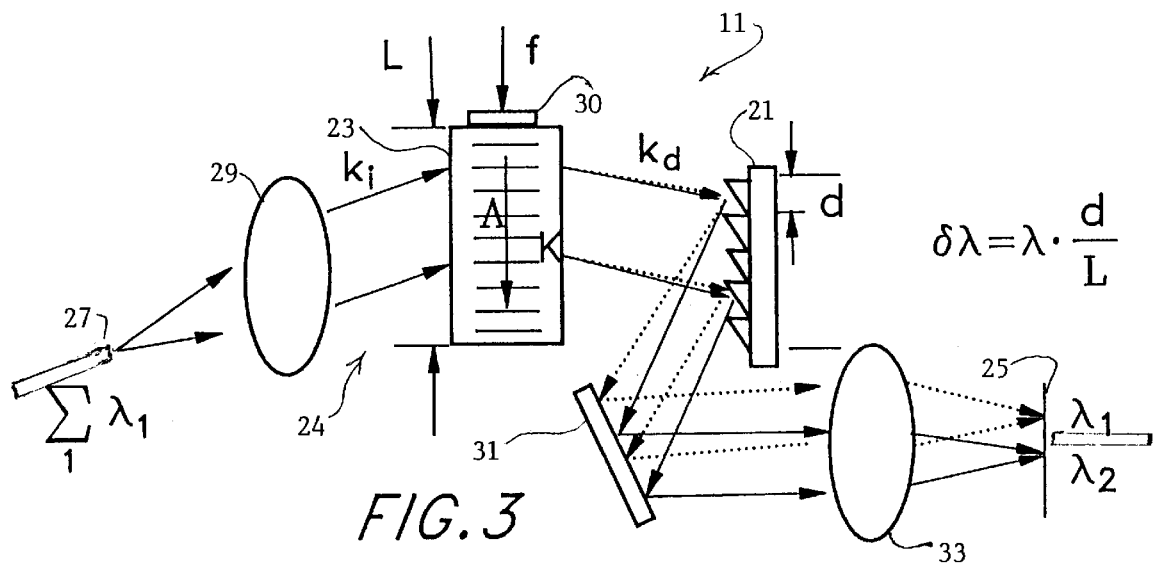
FIG. 3 is a diagrammatic representation of a first embodiment of the grating assisted acousto-optic tunable filter of this invention.

FIGS. 1 through 3 provide a comparison between two types of heretofore known devices having wavelength-selection capability (FIGS. 1 and 2) and grating assisted acousto-optic tunable filter 11 of this invention (FIG. 3). A comparison of the three devices with regard to grating period (or beat length), number of gratings (or beats in case of birefringent acousto-optic tunable filters as shown in FIG. 1) for a qiven interaction lengthy (L), spectral bandwidth and tuning range is provided at Table I.

Since birefringence is small ($\Delta n \ll 1$), N is small and thus bandwidth is relatively large compared with conventional diffraction gratings. For a typical example, where $\Delta n=0.08$, $L=2$ cm, $\delta\lambda=1.5$ nm is obtained. The sidelobes due to the relatively large bandwidth cause a crosstalk problem utilizing such a devise with D-WDM.

For another heretofore known device, acousto-optic spectrum analyzer 15 as shown in FIG. 2 (for purposes of Table I, utilizing a $TeO_2$ slow shear mode analyzer—$v=617$ m/sec, $f=35$ MHz, $\Delta f=25$ MHz, $\Lambda_{AO}=v/f=17.6$ μm—, as indicated by (b) in the table) spectral bandwidth is given by $$\delta\lambda = \frac{\lambda}{N}, \quad N = \frac{L}{\Lambda_{AO}},$$

where $\Lambda_{AO}$ is the period of the acoustic wave inside a medium and N is the number of acoustic periods within the optical aperture and is equal to time-bandwidth product.

Typically, time-bandwidth product of an acousto-optic beam deflector 17 is limited to less than 1,000 at the 1.55 μm wavelengths region, yielding a broad bandwidth. Furthermore, the small diffraction angle of an acousto-optic beam deflector 17 due to the large acoustic grating period $\Lambda_{AO}$ requires a lens 19 with a long focal length in order to separate the output channels, making a tunable filter of this sort bulky and thus unsuitable.

TABLE I

|  | AOTF[(a)] | AOS[(b)] | GA-AOTF[(b)] |
|---|---|---|---|
| Period or Beat length (in μm) | $\frac{\lambda}{\|\Delta n\|}$ ($=15.5$) μ | $\Lambda_{AO} = \frac{v}{f}$ ($=17.6$) μ | $d = 1/1200$ mm ($=0.83$) |
| $N = \frac{L}{\text{Period or beat length}}$ | $\frac{\|\Delta n\| \cdot L}{\lambda}$ | $\frac{L}{\Lambda_{AO}}$ | $\frac{L}{d}$ |
| N for L = 1 cm | 645 | 570 | 12,000 |
| Spectral Bandwidth for $L = 1 \text{ cm} \left(\delta\lambda = \frac{\lambda}{N}, \text{ in nm}\right)$ | 2.4 | 2.7 | 0.13 |
| Tuning range (in nm) | $\lambda \cdot \frac{\Delta f}{f}$ $\left(1550 \cdot \frac{16 M}{175 M} = 142\right)$ | $\lambda \cdot \frac{\Delta f}{f}$ ($=1100$) | $\frac{\lambda \cdot \Delta f}{v} \cdot d = \lambda \cdot \frac{\Delta f}{f} \cdot \frac{d}{\Lambda_{AO}}$ ($=52$) |

Acousto-optic tunable filter (AOTF) 13 as shown in FIG. 1 normally has a collinear configuration using birefringent acousto-optic materials (the AOITF in Table I is an $LiNbO_3$, slow shear mode—$\Delta n=0.1$, $v=3700$ m/sec, $f=175$ MHz, $\Delta f=16$ MHz—tunable filter as indicated by (a) in the table and which is a typical parameter used at the 1.55 μm wavelength). Such devices are presently the most commonly used with current wavelength-division multiplexing due to their compact configuration and potential for low power consumption in an integrated device. The spectral bandwidth of AOTF 13 is given by $$\delta\lambda = \frac{\lambda}{N}, \quad N = \frac{|\Delta n| \cdot L}{\lambda},$$

where $\Delta n$ is the birefringence inside an acousto-optic medium, L is acousto-optic interaction length, $\lambda$ is the wavelength of the light, and N is the number of beats within the interaction length.

Turning now to tunable optic filter 11 of this invention as shown in FIG. 3, the above-mentioned bandwidth limitation of an acousto-optic tunable filter (FIG. 1) can be significantly alleviated by combining conventional diffraction grating 21 in a transverse mode after acousto-optic beam deflector 23 of optical deflector assembly 24. As may be appreciated, beam deflection angle, $\Delta\theta$, for an increment in wavelength, $\Delta\lambda$, and an increment in acoustic frequency, $\Delta f$, is given by $$\Delta\theta = \frac{\Delta\lambda}{d} + \frac{f \cdot \Delta\lambda}{v} + \frac{\lambda \cdot \Delta f}{v}$$

where $\lambda$, d, v, and f are light wavelength, the period of a diffraction grating, acoustic velocity, and the center frequency of acousto-optic beam deflector 23, respectively.

In general, $d \ll \Lambda_{AO} = v/f$ and so the beam deflection angle can be approximated to $$\Delta\theta \approx \frac{\Delta\lambda}{d} + \frac{\lambda \cdot \Delta f}{v}.$$

Therefore, wavelength dependent dispersion is primarily determined by a diffraction grating at 21 (first term), while acousto-optic beam deflector 23 functions as a beam steerer to shift the whole spectrum up and down in spectrum, or output, plane 25. Thus, desired wavelengths can be selected through a pinhole, slit, or optical fiber in spectrum plane 25 by adjusting rf frequencies applied at acousto-optic beam deflector 23.

Spectral bandwidth, $\delta\lambda$, is given by $$\delta\lambda = \frac{\lambda}{N}, \quad N = L/d,$$

where N is the number of grating periods within the optical aperture L. It is to be noted that the short periods, d, of conventional diffraction gratings (approximately 1/20 of those of acousto-optic beam deflectors) permit large N and thus narrow spectral bandwidths.

Tuning range, $\Delta\lambda_T$, can be calculated by equating the first and second term of the beam deflection angle approximation equation given above yielding $$\Delta\lambda_T = \lambda \cdot d \cdot \Delta f / v = \lambda \cdot \frac{\Delta f}{f} \cdot \frac{d}{\Lambda_{AO}}.$$

For a typical example of a slow shear mode $TeO_2$ acousto-optic beam deflector at 1.55 $\mu$m (v=617 m/sec, f=35 MHz, $\Delta f$=25 MHz, as designated, for purposes of comparison, by (b) in Table I for tunable filter 11 if this invention) and a diffraction grating (1200 grooves/mm), d=1/1200 mm=0.83 $\mu$m, $\Delta_{AO}$=v/f=617 m/sec/35 MHz=17.6 $\mu$m. Therefore, spectral bandwidth $\delta\lambda$=0.2 nm and tuning range $\Delta\lambda_T$=52 nm.

It should be appreciated that tuning range has been reduced by the ratio $d/\Delta_{AO}$ (=5%) compared with that of the original acousto-optic spectrum analyzer (as shown in FIG. 2). However, the reduced tuning range is still broad enough to cover the whole EDFA passband which is of primary concern here and for utilization in current D-WDM. For applications requiring a larger tuning range, an acousto-optic material with a larger $\Delta f/v$ ratio can be used (for example, $LiNbO_3$). As in other acousto-optic devices, many rf frequencies can be applied to acousto-optic beam deflector 23 for simultaneous and independent selection of many different channels through the same output node. Also, unlike the AOTF of FIG. 1, the outputs can be directly routed to many different nodes.

Returning now to FIG. 3, light from a source (in the 1/55 $\mu$m region), coupled into a single-mode fiber for example (generally at 27), is collimated by Dens 29 in assembly 24 (focal length=5 cm, diameter=0.8 cm) and directed to acousto-optical beam deflector 2, (while a CRYSTAL TECHNOLOGY, Model 4050-2A, $TeO_2$, slow shear mode, with center frequency at 514 nm has been used experimentally for comparison purposes—see Table I—, the acousto-optic beam deflector utilized in this invention should be optimized at about 1.55 $\mu$m). The collimated light is deflected by acousto-optic beam deflector 23 responsive to the variable rf control signal or signals applied at input 30. Diffraction grating 21 (for example, by RICHARDSON GRATING LAB., 1200 groves/mm, 1.55 microns, Littrow angle=68.41 degrees, gold coated), arranged with grating vectors in a transverse mode relative to light propagation direction from beam deflector 23, diffracts the deflected light from beam deflector 23. The incident angle to the diffraction grating is close to the normal to the surface, and the diffraction angle is around 30 degrees. The diffracted light is folded by IR mirror 31 and focussed by lens 33 (focal length=38 cm) at focal plane 25.

Figure 4A:
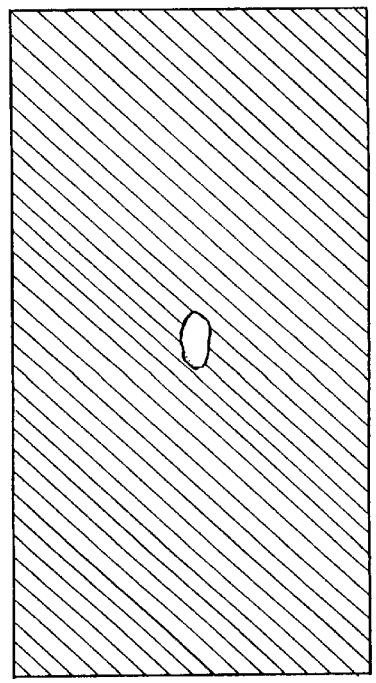
FIGS. 4a and 4b are illustrations of spectra of a Fabry-Perot laser diode comparing resolution by a conventional acousto-optic spectrum analyzer (a) and the filter of this invention (b)
Figure 4B:
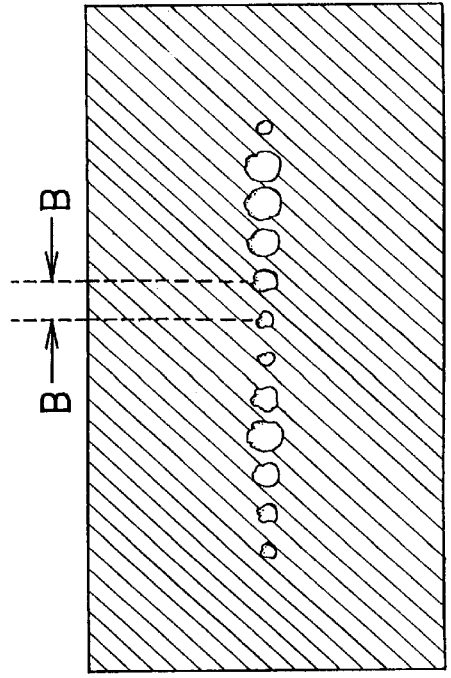

Experimentally, and for purposes here of illustration only, input light at 27 was divided by a directional coupler, the other output going to a conventional acousto-optical spectrum analyzer (15 as shown in FIG. 2). As a test source, a 1.55 micron fiber-pigtailed Fabry-Perot laser diode was used (which has many Longitudinal modes separated by 1.2 nm, which is beyond the resolution of commercially available AOTF's). The spectrum at focal plane 25 was detected by an IR camera, high collimation ensured by use of a plane parallel plate. FIGS. 4a and 4b illustrate the actual spectra obtained by experiment.

FIG. 4a shows the spectrum obtained from the conventional acousto-optical spectrum analyzer 15. As noted herein, it failed to resolve the Fabry-Perot lines. FIG. 4b shows the spectrum obtained by grating assisted acousto-optic tunable filter 11 of this invention. The 1.2 nm Fabry-Perot lines (identified with available wavelength channels) are clearly resolved (separation shown at B—B, for example).

Figure 5A:
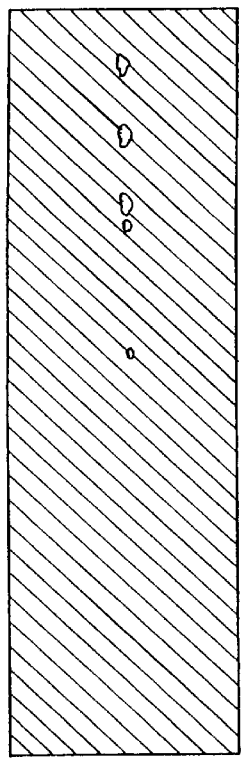
FIGS. 5a through 5c are illustrations of scans of a spectrum for various rf acoustic frequencies as obtained by the tunable filter of this invention.
Figure 5B:
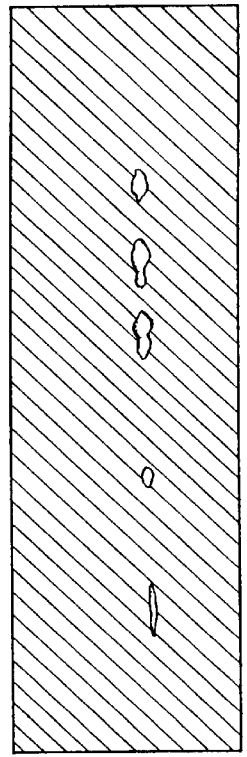
Figure 5C:
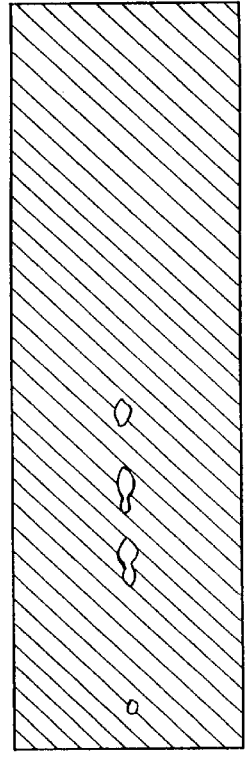

FIGS. 5a through 5c illustrate actual experimentally obtained spectra showing tuning capability of tunable filter 11 of this invention. The whole spectrum of available output channels can be shifted rapidly (within 10 microseconds) along the acoustic wave direction by varying the acoustic frequencies applied to acousto-optic beam deflector 23: FIG. 5a=40 MHz; FIG. 5b=45 MHz; and FIG. 5c=55 MHz. Therefore, through a pinhole, slit, or a fiber in focal plane 25, desired wavelengths can be selectively obtained for output within several microseconds.

In order to keep access time at less than 10 microseconds, the aperture of acousto-optic beam deflector 23 is reduced (for examples above, to about 6 mm resulting in the spectral bandwidth of 0.2 nm). The bandwidth can be further reduced in several different ways, such as by increasing beam deflector aperture size thus sacrificing access speed or by using faster acousto-optic materials such as $LiNbO_3$.

Figure 6:
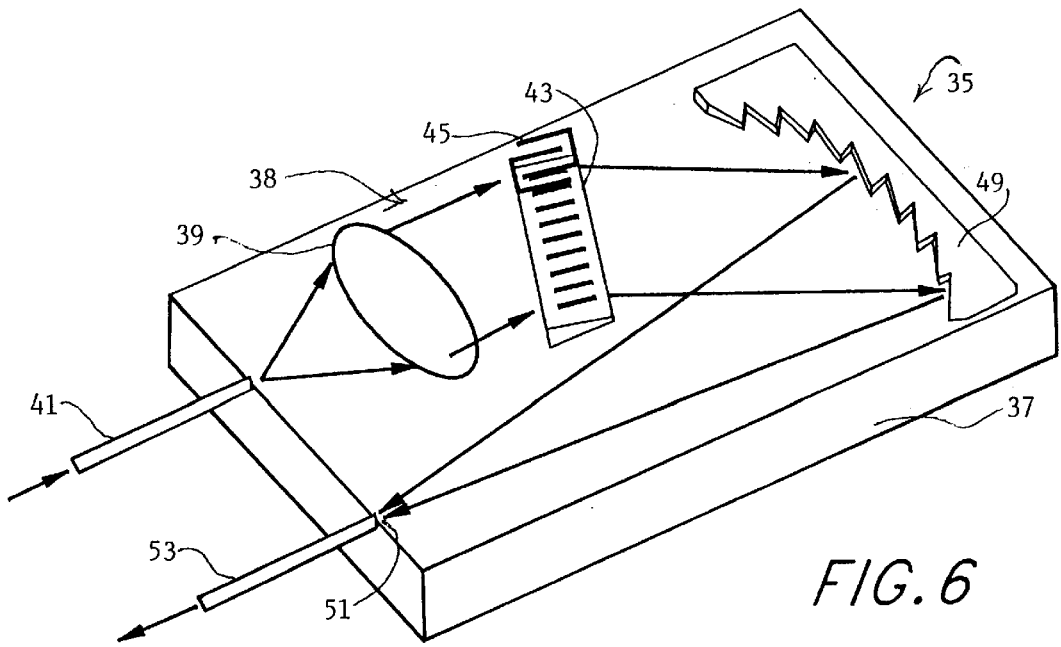
FIG. 6 is a diagrammatic representation of a second embodiment of the grating assisted acousto-optic tunable filter of this invention in an integrated format.

Turning now to FIG. 6, integrated formiat embodiment 35 of the grating assisted acousto-optic tunable filter of this invention is illustrated embodied in waveguide substrate 37. Filter 35 includes an integrated optical deflector assembly 38 having integrated collimating lens 39 that receives light from fiber 41. Collimated light is deflected by acousto-optic beam deflector 43 (a surface acoustic wave (SAW) deflector formed in substrate 37) of deflector assembly 38 responsive to selected signal application at rf input 45. Diffraction occurs at vertical walled circular reflection grating 49 (in the transverse mode relative to light propagation direction) and is focussed to output plane 51 (having output fiber 53 thereat).

The integrated device shown in FIG. 6, may employ well established integrated optic technology that has been previously developed for RF acousto-optic spectrum analyzers. For example, waveguide substrate 37 can be any of several known materials (for example, $LiNbO_3$ with titanium indiffused waveguides, silicon waveguides of either CORNING 7059 glass or $Nb_2O_6$ deposited by sputtering over a thermally grown buffer layer of $SiO_2$, or semiconductor materials such as InP or GaAs/GaP). $LiNbO_3$ with titanium indiffused waveguides has been widely used for such applications. As is known, the $LiNbO_3$ substrate is configured with the c axis parallel to acoustic propagation. Optical waveguides are formed by diffusing several hundred angstroms of titanium into the LiNbO$_3$ substrate to obtain a tight confinement of the optical beam.

Both input and output fibers 41 and 53 are preferably single-mode at 1.55 microns and are mounted at the substrate using well established silicon v-groove techniques. Lens 39 may be integrated in several different ways known to those skilled in the art, for example utilizing geodesic lens formation. These are circularly symmetric aspherical depressions in the surface of waveguide substrate 37 and can be fabricated by single-point diamond tuning. F-number of lens 39 should be about 4 with a focal length of around 2.5 cm to 4 cm to give a collimated beam diameter of around 6 mm to 10 mm. SAW transducer 43 may be any of the two element tilted arrays heretofore known, and is designed to have a desired bandwidth and center wavelengths as discussed herein above.

Single vertical walled circular reflection diffraction grating 49, to obtain a high resolution diffraction grating with a period of less than about 1 micron (>1000 grooves/mm), may be formed utilizing a dry etching with photo-resist mask. Chemically assisted ion beam etching renders a high quality reflecting wall, high resolution and a large aspect ratio. The grating profile is designed to be circular so that the input beam is collimated and the output beam is focussed. However, a planar grating could be used so that both beams can be collimated, with an additional lens used at the output to focus the beam to the output plane. A Littrow-type configuration could, by way of further example, be utilized so that the diffracted beam passes through the same SAW and lens, and is separated by a beam splitter to focus to the output fiber.

While not shown in the FIGURES, in order to keep tunable filtering regardless of the polarization of the input beam, polarization diversity can be employed at the front part of the device of this invention. This may be achieved, for example, simply by adding a TE-TM splitter, subsequently a TE-TM converter (on one arm to rotate one of the polarizations by 90 degrees), and a beam combiner. This polarization diversity portion can be either separate of substrate 37 or integrated thereinto.

The tunable filter of this invention provides a narrow spectral bandwidth to permit a significantly larger number of wavelength channels compared with conventional acousto-optic spectrum analyzers or AOTF's (around 20 times more), while still preserving fast tuning speed and a tuning range large enough for its application. The tunable filter also permits simultaneous and independent selection/routing of many wavelength channels and can thus be used for multi-channel wavelength division multiplexing filter/routers/switches, or fast scan optical spectrum analyzers. The filter architecture when integrated into a waveguide device as shown in FIG. 6 is characterized by low power consumption and compactness.

As may be appreciated from the foregoing, by combining an acousto-optic beam deflector with a diffraction grating in a transverse mode (i.e., with the grating vector direction transverse to the light propagation direction as shown in FIGS. 3 and 6) better output resolution (less than 0.2 nm at 1.55 microns, for example as low as at least 0.13 nm FWHM) with fewer sidelobes is obtained. Since the input beam from a single-mode fiber is gaussian along the transverse direction, apodization is automatically achieved with no further manipulation.

While a reduced tuning range results (about 50 nm), by optimizing parameters of commercially available acousto-optic beam deflectors (slow shear mode tellurium dioxide, center frequency 35 MHz, bandwidth 25 MHz, for example) the tuning range can be tailored to cover the conventional communication wavelength range tround 1.55 microns (about 35 nm to 50 nm, the passband for currently utilized erbium-doped fiber amplifiers).

What is claimed is:

1. A tunable acousto-optic filter tunable across substantially the entire EDFA passband and receiving light from a source and providing plural available light wavelength channels for selective output, said filter comprising:

an acousto-optic beam deflector having a variable control signal input for selectively deflecting received light, light deflection angle being variable by operation of said control signal input;

a grating having a grating vector orientation transverse to propagation direction of light from said acousto-optic beam deflector for wavelength dependent dispersion of light deflected at said acousto-optic beam deflector to provide a resolution enhanced spectrum of available output channels in an output plane; and at least a first fixed output location at said output plane for output thereat of at least a first selected one of said output channels shifted to said output location by operation of said acousto-optic beam deflector.

2. The filter of claim 1 wherein said grating is one of a conventional diffraction grating and a vertical walled circular reflection grating.

3. The filter of claim 2 further comprising a waveguide substrate, said acousto-optic beam deflector and said grating being integrated at said substrate.

4. The filter of claim 1 wherein said grating is characterized by grating periods that are short compared with grating periods of said acousto-optic beam deflector for a given interaction length.

5. The filter of claim 1 wherein said acousto-optic beam deflector is selected for frequency and bandwidth parameters providing an overall filter tuning range covering the conventional communications wavelength range around 1.55 microns.

6. The filter of claim 1 further comprising a collimating lens for collimating received light from the source before deflection by said acousto-optic beam deflector.

7. The filter of claim 1 further comprising reflection and focusing means receiving dispersed light at said grating and for processing said dispersed light to said output plane.

8. The filter of claim 1 wherein said grating and said acousto-optic beam deflector both have a grating period, and wherein said grating period of said grating is significantly less than said grating period of said acousto-optic beam deflector thereby enhancing spectral resolution.

9. A tunable acousto-optic filter tunable across substanitally the entire EDFA passband and receiving light from a source and providing plural available light wavelength channels for selective output, said filter comprising:

an optical deflector assembly including a variable rf control signal input for selectively deflecting received light, deflection angle being variable responsive to frequency of signal applied at said rf control signal input; and a diffraction grating characterized by grating vector orientation transverse to light propagation direction for wavelength dependent dispersion of light deflected at said optical deflector assembly to provide a resolution enhanced spectrum of available output channels at an output plane, said spectrum being shiftable in said output plane by operation of said optical deflector assembly.

10. The filter of claim 9 wherein said optical deflector assembly includes a collimating lenis and an acousto-optic beam deflector having said rf control signal input thereat.

11. The filter of claim 9 further comprising a waveguide substrate having said optical deflector assembly integrally formed thereat.

12. The filter of claim 11 wherein said diffraction grating is a reflection grating.

13. The filter of claim 9 wherein said output plane has at least a first output node, channel output selection at said output node accommodated by said spectrum shifting relative to said output node at said output plane responsive to selected rf frequency applied at said control signal input of said optical deflector assembly.

14. A method for increasing wavelength channels available for output from a tunable optical filter tunable across substantially the entire EDFA passband comprising:

acousto-optically deflecting light input;

controlling deflection angle of said light input based on desired wavelength channel output; and diffracting the deflected light providing a resolution enhanced spectrum of available wavelength output channels at an output plane, said spectrum of output channels being shiftable in said output plane by control of said deflection angle.

15. The method of claim 14 further comprising selecting at least a first wavelength channel from said resolution enhanced spectrum of available wavelength cutput channels for output by applying at least a first selected control signal to control said acousto-optical deflection angle thereby shifting said spectrum of channels in said output plane.

16. The method of claim 15 wherein said control signal is selectively variable to provide rapid selectability of wavelength output.

17. The method of claim 14 further comprising the step of collimating light input before deflection.

18. The method of claim 14 wherein the step of diffracting deflected light includes utilizing a grating characterized by grating vector orientation transverse to light propagation direction.

19. The method of claim 14 wherein said spectrum of available wavelength output channels covers substantially the entire EDFA passband.

20. The method of claim 19 wherein said light input is characterized by plural longitudinal modes separated by less than about 2 nm, and wherein said wavelength channels are identified by resolution of said modes characterizing said light input in said output plane.

* * * * *